(12) United States Patent  (10) Patent No.: US 11,898,614 B2
Baldoni et al.  (45) Date of Patent: Feb. 13, 2024

(54) PLANAR TORSIONAL SPRING

(71) Applicant: SCUOLA SUPERIORE DI STUDI UNIVERSITARI E DI PERFEZIONAMENTO SANT'ANNA, Pisa (IT)

(72) Inventors: Andrea Baldoni, Perugia (IT); Matteo Fantozzi, Viareggio (IT); Nicola Vitiello, Pontedera (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 221 days.

(21) Appl. No.: 17/294,933

(22) PCT Filed: Nov. 20, 2019

(86) PCT No.: PCT/IB2019/059975
§ 371 (c)(1),
(2) Date: May 18, 2021

(87) PCT Pub. No.: WO2020/104962
PCT Pub. Date: May 28, 2020

(65) Prior Publication Data
US 2022/0003292 A1   Jan. 6, 2022

(30) Foreign Application Priority Data

Nov. 21, 2018 (IT) .......................... 102018000010483

(51) Int. Cl.
F16F 1/02 (2006.01)
F16D 3/72 (2006.01)
F16D 3/79 (2006.01)

(52) U.S. Cl.
CPC ................ *F16F 1/027* (2013.01); *F16D 3/72* (2013.01); *F16D 3/79* (2013.01);
(Continued)

(58) Field of Classification Search
CPC .. F16F 1/027; F16F 1/3821; F16F 1/14; F16F 1/025; F16F 3/00; F16F 3/023; F16F 3/02;
(Continued)

(56) References Cited

U.S. PATENT DOCUMENTS 1,455,242 A * 5/1923 Corgiat, Jr. ............... F16D 3/78
464/99
1,495,327 A * 5/1924 Kehoe ....................... F16D 3/78
464/95
(Continued)

FOREIGN PATENT DOCUMENTS

CN 103836101 A * 6/2014
CN 105058414 A * 11/2015
(Continued)

OTHER PUBLICATIONS

International Search Report and Written Opinion for Corresponding International Application No. (PCT/IB2019/059975 (11 Pages) (dated Mar. 10, 2020).

*Primary Examiner* — Robert A. Siconolfi
*Assistant Examiner* — San M Aung
(74) *Attorney, Agent, or Firm* — Workman Nydegger

(57) ABSTRACT

The object of the present invention is a new configuration of torsional spring with a flat structure, capable of ensuring response linearity, modelling ease and accuracy, versatile use while safeguarding the possibility of the inner passage of wiring or of any accessory components along the transmission/torsion axis.

16 Claims, 5 Drawing Sheets

(52) U.S. Cl.
CPC ... *F16F 2230/0005* (2013.01); *F16F 2234/06* (2013.01); *F16F 2236/08* (2013.01)

(58) Field of Classification Search
CPC ............. F16F 15/1216; F16F 15/1214; F16F 15/1217; F16F 2230/0005; F16F 2230/36; F16F 2234/06; F16F 2236/08; F16D 3/62; F16D 3/68; F16D 3/72; F16D 3/79; B25J 9/0015; B25J 17/00; B25J 17/02; B25J 17/0208; B25J 17/0241; B25J 19/0091; B25J 19/06; B25J 13/085; H02K 7/10; H02K 7/14; H02K 7/1163; G01L 3/1407; G01L 3/1457; G01B 11/16
USPC .......................................................... 267/165
See application file for complete search history.

(56) References Cited

U.S. PATENT DOCUMENTS

| | | | | |
|---|---|---|---|---|
| 2,855,767 | A * | 10/1958 | Ahlen | F16D 3/77 464/98 |
| 3,985,000 | A * | 10/1976 | Hartz | F16D 3/79 403/220 |
| 5,992,782 | A * | 11/1999 | Goodknight | F16D 3/78 242/340 |
| 6,547,666 | B2 * | 4/2003 | Kropp | F16D 3/79 464/99 |
| 2011/0064964 | A1* | 3/2011 | Shu | F16D 3/79 428/600 |
| 2014/0045600 | A1* | 2/2014 | Zhu | B25J 9/0015 464/92 |
| 2014/0353891 | A1* | 12/2014 | Wood | F02G 1/0435 267/161 |
| 2015/0041619 | A1* | 2/2015 | Ellis | F16F 1/324 248/603 |
| 2018/0298973 | A1* | 10/2018 | Liao | F16F 3/00 |

FOREIGN PATENT DOCUMENTS

| | | | | | |
|---|---|---|---|---|---|
| CN | 106078791 | A | | 11/2016 | |
| CN | 106272555 | A * | 1/2017 | ......... | B25J 17/0208 |
| CN | 106641057 | A | | 5/2017 | |
| CN | 106931060 | A * | 7/2017 | | |
| CN | 107962591 | A * | 4/2018 | ......... | B25J 19/0095 |
| CN | 108904221 | B * | 10/2020 | ............ | A61B 5/112 |

* cited by examiner

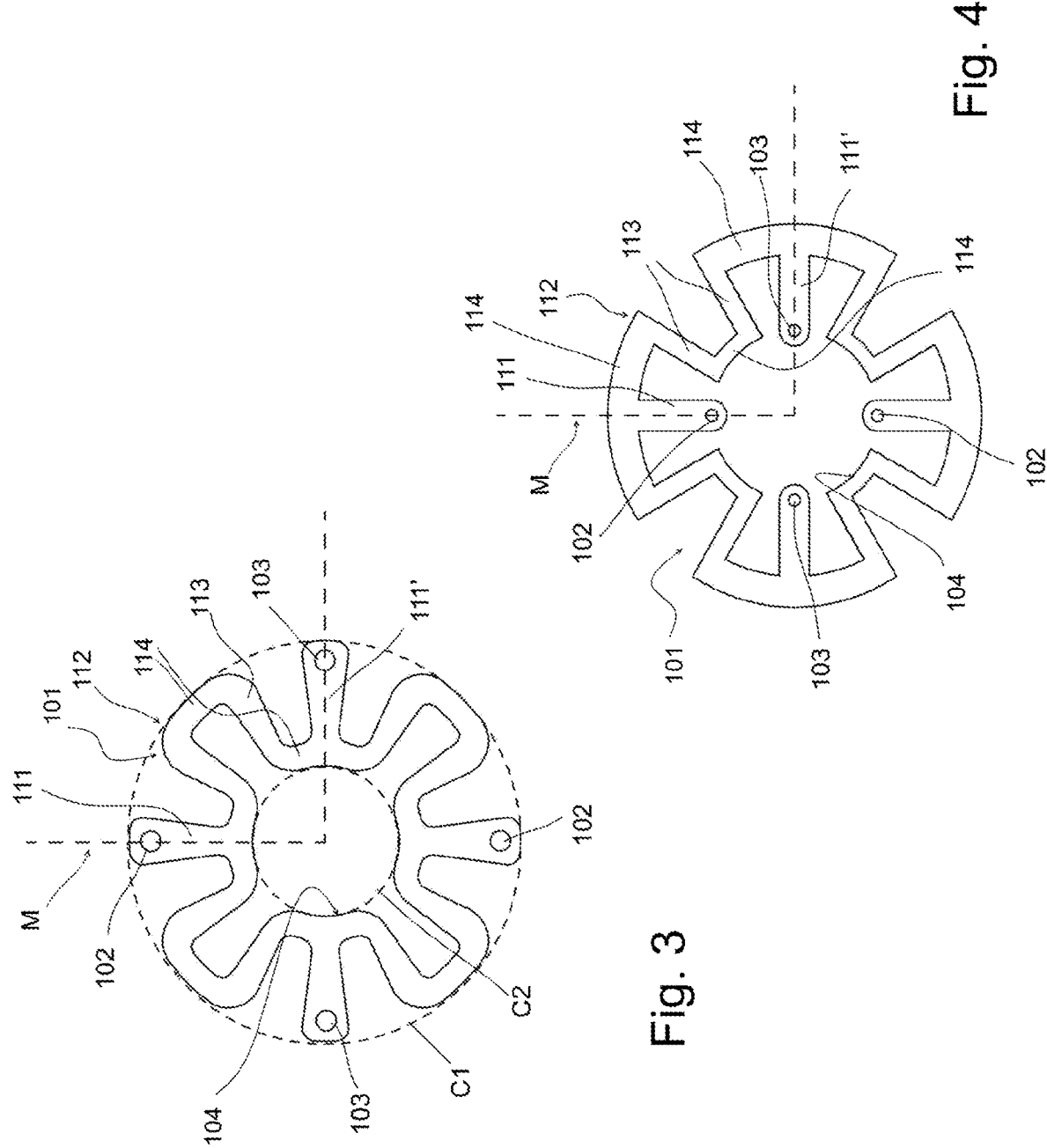

PLANAR TORSIONAL SPRING

CROSS-REFERENCE TO RELATED APPLICATIONS

This application is a 371 of PCT/IB2019/059975, filed Nov. 20, 2019, which claims the benefit of Italian Patent Application No. 102018000010483, filed Nov. 21, 2018.

TECHNICAL FIELD OF THE INVENTION

The object of the present invention is a new configuration of torsional spring with a planar structure.

BACKGROUND OF THE INVENTION

A recurring need within the engineering field is the one of arranging springs with the most disparate functions, among which preloading, storing energy, low-pass mechanical filter function, obtaining an elastic response to a given load.

When the compactness of the machinery designed is a highly conditioning factor, such as for example in advanced projects such as the ones in the field of wearable robotics, the problem arises of finding a difficult compromise between performance and overall dimensions of the spring, without disregarding the aesthetical factor. The greater is the importance of the functional role carried out by the spring in its mechanical unit, the more critical this compromise is.

Various sub-problems are of significant importance in this generic context, and more specifically referring to the case of rotational actuations, and therefore to elastic elements in which there is a transmission of a torsional load. The spring must have a linear response, be easily modelled, firmly connectable to the load input and output to eliminate the presence of clearance without introducing a preloading through ring nuts or countering springs, and again to allow the passage therein of shafts or other mechanical elements, wiring, etc.

A torsional spring having generically planar configuration may be a highly interesting option with respect to the aforesaid problems. Moreover, the planar torsional springs of known type do not provide satisfactory response to all the above-indicated criticalities.

Known planar springs include springs with coil configuration, such as for example the one shown in Furnémont et al., *TORSION MACCEPA: A novel compact compliant actuator designed around the drive axis*—IEEE International Conference on Robotics (ICRA 2015). The lack of symmetry, the geometric parametrization involving various quantities, the incidence of the radial stresses generated by the deflection of the spring under torsion, are among the aspects compromising the performance and design efficacy of this solution. Dual coil solutions like the one shown in Stienen et al., *Design of a rotational Hydroelastic Actuator for a Powered Esoskeleton for Upper Limb Rehabilitation*— Transactions on Biomedical Engineering (Vo. 57, n. 3. March 2010) avoid radial stresses on the drive shaft, but otherwise substantially have similar defects to the previously considered case, in addition to the fact that the spring is still deformed in a different fashion depending on the rotation direction, with the stiffness generating elements touching one another prior to the load limit, thus increasing the rigidity for torque loads that in any case are below the aforesaid limit.

Another group of known solutions provides the planar configuration to comprise an inner ring, an outer ring (on which there are respectively applied the input torsional load and the output torsional load, or vice versa) and a system of mainly radial evolving elements that join such rings and that with their elastic bending have the transmission task. Such radial elements may include radial members which expand with lobed formations following circumferential directions, as in Tagliamonte et al., *Design of a variable impedance differential actuator for wearable robotics applications*— IEEE/RSI International conference on Intelligent Robots and Systems (IROS 2010), or radial members which detach from the outer ring and then evolve in a serpentine fashion towards the inner ring, as in dos Santos et. al. *Torque control characterization of a rotary series elastic actuator for knee rehabilitation*—$16^{th}$ International Conference on Advanced Robotics (ICAR) 2013. Also solutions of this kind are not completely satisfactory in terms of the absolute efficiency and/or design modelling, which should take advantage of (not as in these known cases) a reduced number of homogeneous quantities to consider, in order to finely cover the broadest range of performance/rigidities required.

A known torsional spring of the planar type is also disclosed in Chinese patent publication CN106078791. This spring comprises a monolithic body having a planar structure, in which an inner ring and an outer ring are intended respectively for the connection of the body to an actuating organ and an actuated organ, to elastically react to a torsional stress around a transmissive axis which is orthogonal to the plane on which the body develops. The two rings are joined by a beam-like pattern formed by removal of material from the body, following a serpentine path and connecting main radial members that extend alternatively from the outer ring and the inner ring, two consecutive main radial members defining a modular sector of the pattern. The serpentine thus evolves from a radially external end of a main radial member and the internal radial end of the consecutively following main radial member, in a symmetrical fashion among two modules that are adjacent on the main radial member that separates such modules (and that is shared between the modules). In each main radial member one only and the same end, internal or external, is the connection end of, and is shared by, two serpentines of respective adjacent modules. The rings are respectively integral with the other ends; in this sense, the outer ring is integral only to external ends and the inner ring only to internal ends.

This configuration offers interesting performances, but can nevertheless show some problems as far as the stress balance and also the versatility of use are concerned.

SUMMARY OF THE INVENTION

Therefore, the object of the present invention is to provide a torsional spring with a planar configuration, which offers an advantageous alternative with respect to known planar springs, in particular in terms of response linearity, modelling ease and accuracy, versatility of use.

These and other objects are achieved by the planar torsional spring according to the invention, the essential features of which are defined by the first of the appended claims. Further important optional features are defined by the dependent claims.

BRIEF DESCRIPTION OF THE DRAWINGS

The features and advantages of the planar torsional spring according to the present invention shall be apparent from the description below of embodiments thereof, made by way of a non-limiting example, with reference to the accompanying drawings in which:

FIGS. 3 and 4 are front views of springs in two different embodiments of the invention;

DETAILED DESCRIPTION OF THE INVENTION

Figure 2:
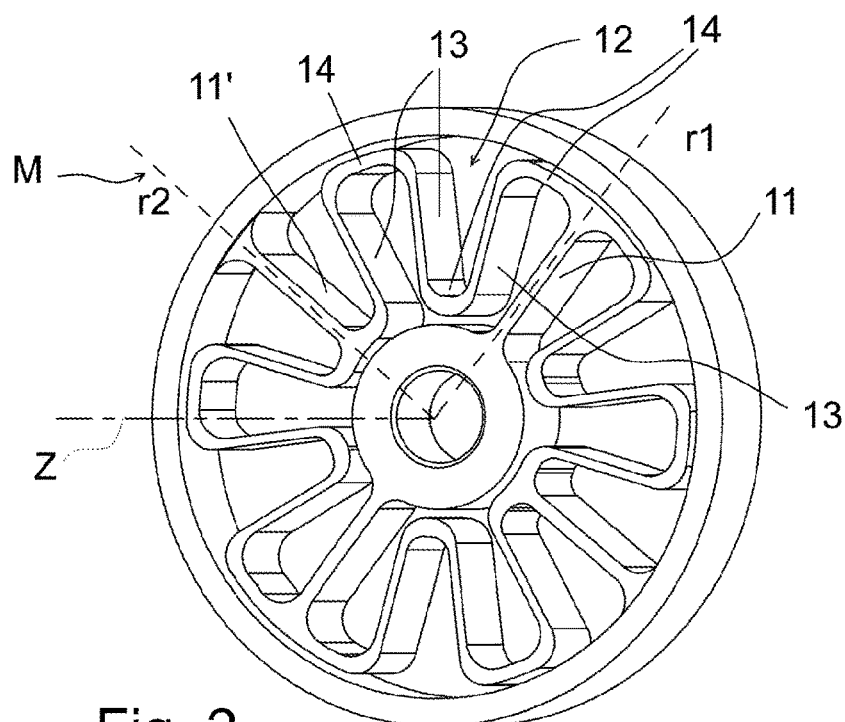
FIG. 1 and FIG. 2 are a front view and an axonometric view of a spring according to the prior art.
Figure 1:
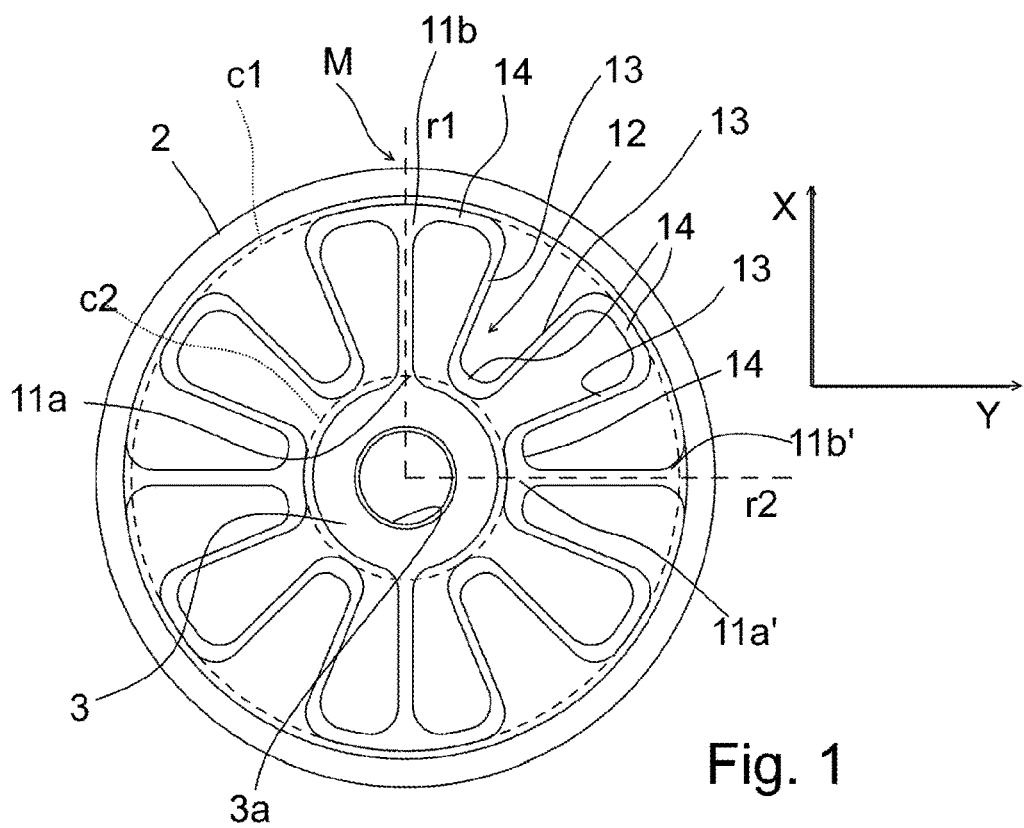

With reference to FIGS. 1 and 2, the conceptual general scheme of the spring according to the invention is alike the one of a known spring, and will described hereafter with reference to the latter as shown in the figures just mentioned. The spring comprises a unitary body 1 having a planar structure, that is mainly developing on a plane XY orthogonal to a transmissive axis Z along which the torsional load is intended to be exchanged between an actuator element and an actuated element (not depicted), the body 1 being arranged and connected between such elements as explained hereafter.

The body 1 is delimited on the plane XY by a circular (as in this case) or polygonal major outline c1 circumscribing and substantially delimiting (but not excluding possible isolated protruding elements) the outer periphery of the body itself, centered in the transmissive axis Z. A number of cavities is obtained on body 1 by removal of material, defining on the same body a beam-shaped pattern comprising an even number n of modules M, each module occupying a sector identified by the aforesaid major outline c1 and by two radiuses r1, r2 forming a central angle of $2 \cdot \pi/n$. The number n of modules typically and advantageously, although not necessarily, is greater than or equal to 4.

Each module M comprises two main radial members 11, 11' arranged along respective radiuses r1, r2 and shared among adjacent modules, each of said members having a radially internal end 11a, 11a' and a radially external end 11b, 11b'. The module further comprises a linking portion 12 evolving between, and only linked with, two internal or external ends of the two main radial members, symmetrically between two modules that are adjacent with respect to the radius r1, r2 that separates them, and such that in each main radial member 11 one only and the same internal end 11a, 11 a' or external end 11b, 11b' be shared between two linking portions 12 of respective adjacent modules. Preferably the linking portion 12 in each module is a portion evolving as a serpentine and comprising one or more secondary radial members 13 connected to the main members and, in case there are two or more of such secondary radial members 12, through respective circumferential members 14.

With reference to the example illustrated, in module M as isolated in FIG. 1, the serpentine portion starts from the radially external end 11b of a first main radial member 11 and then evolves with one or more secondary radial members 13 (two in this case) and passing through one or more circumferential members 14, it joins the radially internal end 11a' of the second (other) main radial member of the same module. The evolution of the linking portion continues symmetrically from this same end in the successive/adjacent module, and the same can be said for the evolution upstream of the above-mentioned first main radial member.

Again with reference to the same module, at the opposite ends 11a, 11 b' with respect to the ones on which the joining is made with the linking portion 12, there are provided, on the main members of the module, connection means for connecting the spring to an actuating element/organ and to an actuated element/organ due to which the aforesaid torsion load is generated.

In the known solution here considered, such connection means are represented by an outer ring 2 and by an inner core 3, respectively the inner and outer edges of which are outside the major outline c1 and inside a minor outline c2 (which in turn is circular or polygonal) that is more displaced towards the centre with respect to the major outline, and which thus internally delimits the body 1. In particular, the main radial members (11, 11') are alternately integral, one with the outer ring 2 and one with the inner core 3, which is here provided with a central passageway 3a and therefore is configured in turn in the shape of a ring, following the circumferential succession thereof. The mechanical connection between the rings and the relative organs clearly occurs through any suitable mechanical connection means that is well known to the skilled person and likewise is not illustrated (moreover being variable as a function of the specific configuration of the elements).

On the basis of the known solution described above, it is clear that, since the rings join the internal and external ends of the main members, the transmission of the torque occurs in a radially staggered fashion between the load input and output, in the sense that if the actuation is inputted via the outer ring, the output is on the inner ring, and vice-versa.

Instead, according to the present invention, within a general arrangement that has basic features in common with the known one as described, a specifically different solution is disclosed, represented by FIGS. 3 and 4, in which elements corresponding to the ones already described for the known spring bear corresponding reference numerals (in the order of hundreds).

It can be appreciated that, according to the invention, the connection means get rid of rings, or similar system that make, respectively, the internal or external ends of the main members integral with each other. Accordingly, the arrangement of the connections on and between the main radial members will follow different distributions and configurations (for instance but not necessarily with substantially serpentine-shaped linking portions).

The connection means here are the same free ends of the relevant main radial members, preferably taking on an engagement conformation, such as simple holes 102, 103 at the ends of the radial members, holes that can be more than one for each member, not necessarily inside the outline c1 and not necessarily at the same distance from the transmission axis Z. Different and equivalent solutions can be generally provided, such as protrusions, reliefs, shaped parts etc.

According to the invention, the (free) ends of the main members opposite to the ends on which the linking portions are joined, and thus the connection means, are not with an alternated sequence outside-inside-outside etc, but all on radially external locations (first embodiment, FIG. 3) or all on radially internal locations (second embodiment, FIG. 4). Preferably, as shown in both cases, all the locations are at the same distance from the transmissive axis.

In this way, it is clear that the torsional stress is exchanged between input and output at points that are substantially at the same distance from the central axis, with a clear advantage in terms of balance of the force/stress field that is established as a result of the transmission. It is in any case always advantageous for the input load and the output load alternate, following the peripheral/circumferential evolution of the spring, such a circumstance being shown by the different numeric indication that distinguishes the holes 102 intended for the load input (connection of the actuation element) from holes 103 intended for the output load (connection to the actuated element). The free ends can also be on one or more parts branching off from the relative main radial member, beyond a branching node that is radially displaced (with respect to the very end) towards the centre in case radially external connection means, or a branching node that is radially displaced away from the centre in case of internal connection means. For example, the branching can comprise branches that are directed circumferentially or slanting, this permitting to allocate the connection means (e.g. the holes) in positions that can even be staggered with respect to the median axis of the relative main radial member.

In greater detail concerning the structural configuration of the invention, it is also worth noting here the module defined between two main radial members, with the relative linking portion 112 defined by serpentines with secondary radial members 113 and circumferential members 114. The circumferential members 114 define, respectively with their outer edges (in the case of the more peripheral members) and their inner edges (in the case of the members that are closer to the centre), respectively the major outline $c1$ and the minor outline $c2$, which here is the perimeter of a central passageway. In both embodiments, for the sake of an easy interpretation, the various components are designated by homogeneous numeric indexes, in spite of the fact that they follow structural organizations which overall are not congruent (in other words, they materialize on different objects).

Figure 5A:
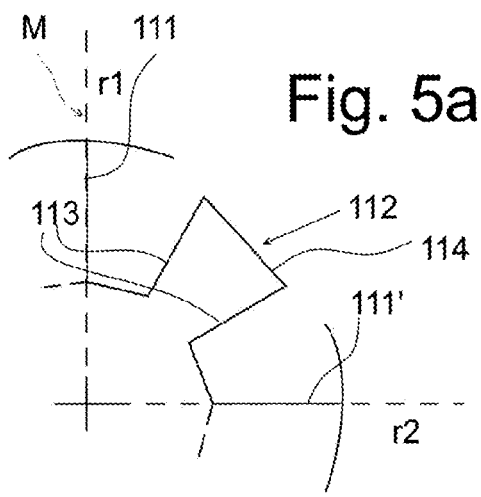
FIGS. 5a and 5b are conceptual schemes of springs according to the invention, corresponding to the embodiments of FIG. 3 and FIG. 4.
Figure 5B:
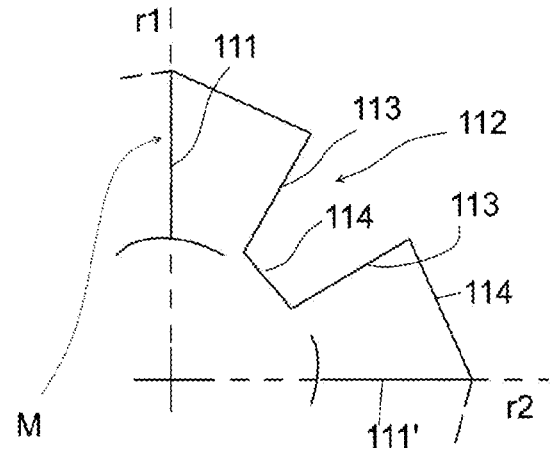

Conceptual schemes of springs according to the two above-described embodiments are shown in the self-explanatory FIGS. 5a and 5b. Such embodiments however do not exhaust the implementation possibilities of the invention, which may not provide a serpentine shape for the linking portion between two main members that contrarily to the depicted embodiments, may not even extend for substantially the whole difference of radius between the two outlines $c1$, $c2$. The linking portion, in other words, can follow any evolution or pattern different from a serpentine (broken lines of various geometry, spirals etc.) while still in accordance with the configuration and condition of symmetry on which the structure relies.

As mentioned, in general the path of the linking portion between two major and minor outlines is a construction option to be considered as advantageous. In this case, again advantageously, at least the main radial members radially extend for at least a half of the maximum radial distance between said major outline $c1$ and said minor outline $c2$.

At least the main radial members may have, advantageously depending on the specific application, a substantially laminar structure, in the sense that the thickness thereof measured on the plane XY transverse to the axis of elongation of the member (or similar elongated component of the beam-shaped pattern) is reduced (for example, in ratio of 1/5 or less) with respect to the measurement in length according to such axis. Moreover, it is suitable to note that when planar structure is being discussed, it refers to a body in which the ratio between the maximum width of the major outline and the thickness measured along the transmissive axis is greater than or equal to 5.

Figure 6A:
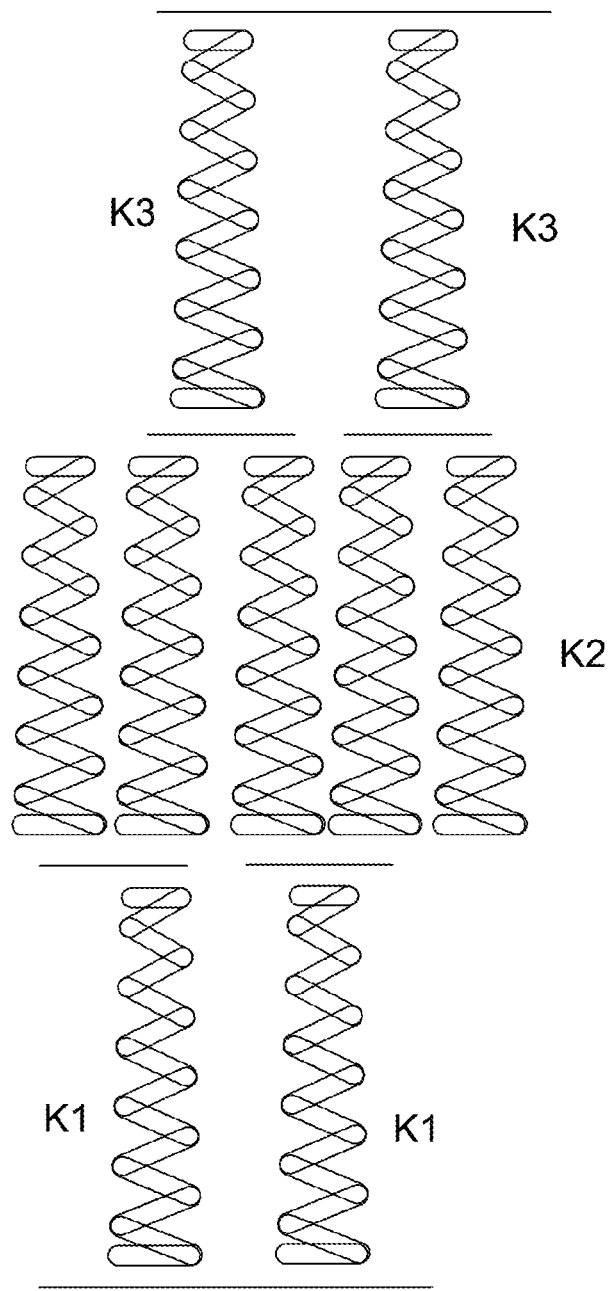
FIGS. 6a and 6b are schematizations of a spring according to the invention, within the conceptual terms of a system of cantilever beams and relative equivalent spring systems.
Figure 6B:
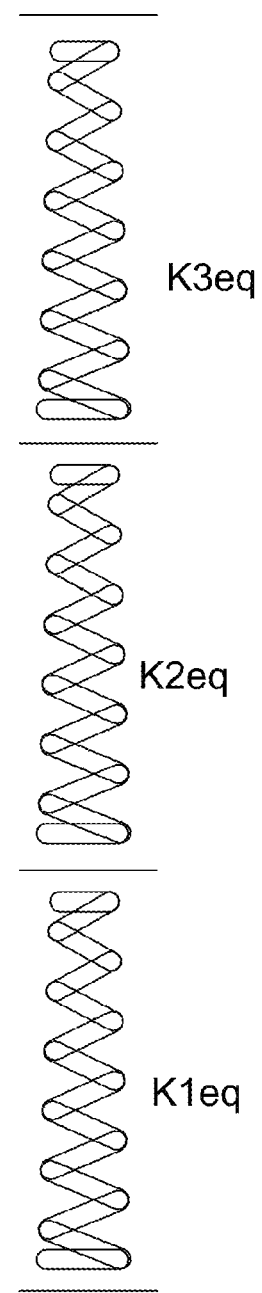

An important advantage that in all cases results from the invention is the ease with which the equivalent torsional rigidity of the spring can be determined, something which evidently makes the design modelling simple and accurate. The calculation of such equivalent rigidity is based on the consideration that as an optimal approximation, the active components of the spring, in particular the beam-shaped ones of the examples indicated above, may be considered as a suitable combination of cantilever beams, according to the diagrams in FIGS. 6a and 6b. Diagram 6a in particular depicts the schematisation of the system as an assembly of springs in series and in parallel that operate bending (with individual bending factors $K_n$) following torsional load between input and output, while diagram 6b is the reduction of the preceding diagram as series of individual springs, each associable with an equivalent rigidity factor $K_{n\text{-}eq}$. The mathematical resolution of the system as schematized here is clear based on laws that are well known to the expert in the field.

The rigidity desired can be optimized by acting on the various geometric parameters such as in particular, the thickness and the sizes of the beam-shaped segments or members. Obviously, a fundamental variable for obtaining the features desired is the material used: the most suitable materials are the metal materials used generally for mechanical constructions. These include steel, aluminium alloys and titanium alloys. Primarily, material may be identified in Young's module once the fundamental size is chosen to obtain the rigidity features of the element. The selection of the material to be used, in addition to the rigidity desired, directly follows the entity of the load that the joint is to be capable of supporting and the level of dimensional compactness to be obtained.

Specifically, the cavities and the notches may be made with laser cutting systems on a primitive planar body made of metal material, preferring generally resistant and flexible steels such as steel for springs or harmonic steel (for example, maraging steel DIN 1.6358-X2NiCoMo 18-9-5, Young's module: 193 GPa, yield stress di 1815 MPa). Compatibly with the sizes of the cavities and of the whole body, processing by chip removal machining may be possible.

Due to their structure, several springs according to the invention advantageously are particularly suitable to be associated with one another to form an elastic system that provides a plurality of springs side by side in the axial direction of a common transmissive axis Z, and connected with means of various nature that in any case, create a bridge extending axially between one spring and the successive spring of the assembly. With reference to figures from 7a to 8b, such bridging members may for example, be simple linear links 4, 5 that extend between the holes 102, 103 of main radial members of springs such as the one in FIG. 3, being it clear that the connection is made particularly effective (and the stress field on the spring package/assembly particularly balanced) thanks to the fact that it is possible to act on connection points that are all at the same radial position.

Figures 7A, 7B:
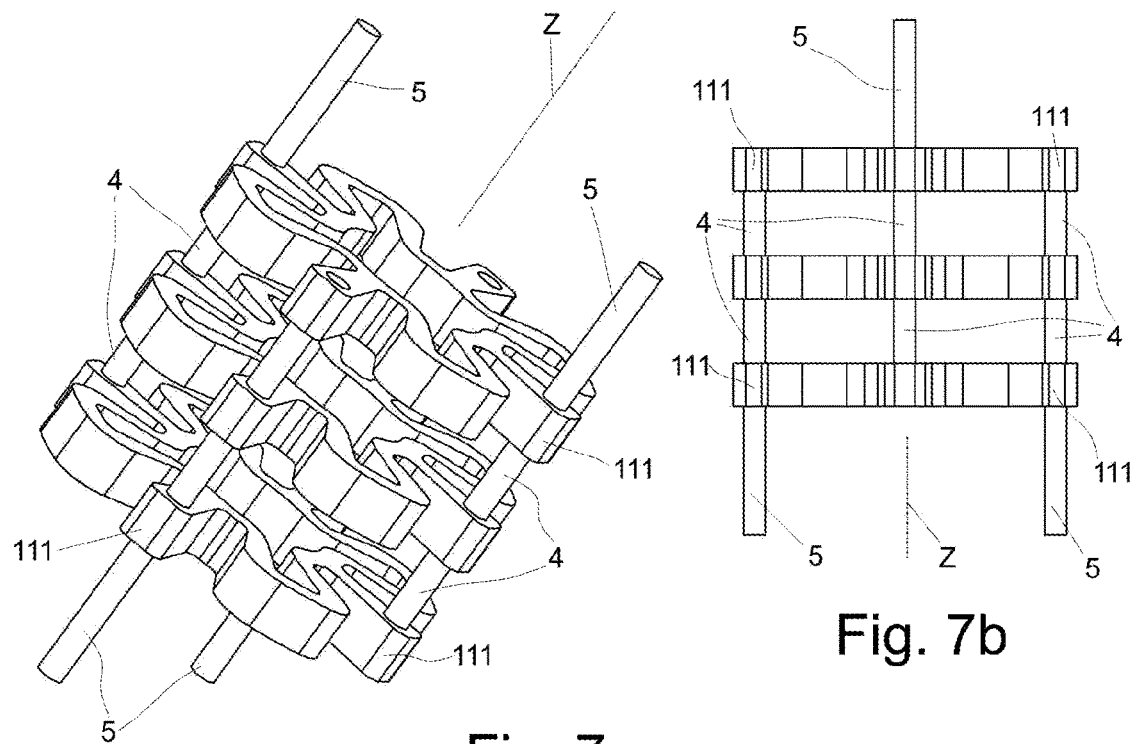
FIGS. 7a, 7b, 8a, 8b show elastic assemblies, each in an axonometric view and in a side view, obtained by respectively connecting in parallel (FIG. 7) and in series (FIG. 8) a plurality of springs according to the invention, here in particular springs according to the embodiment of FIG. 3.
Figures 8A, 8B:
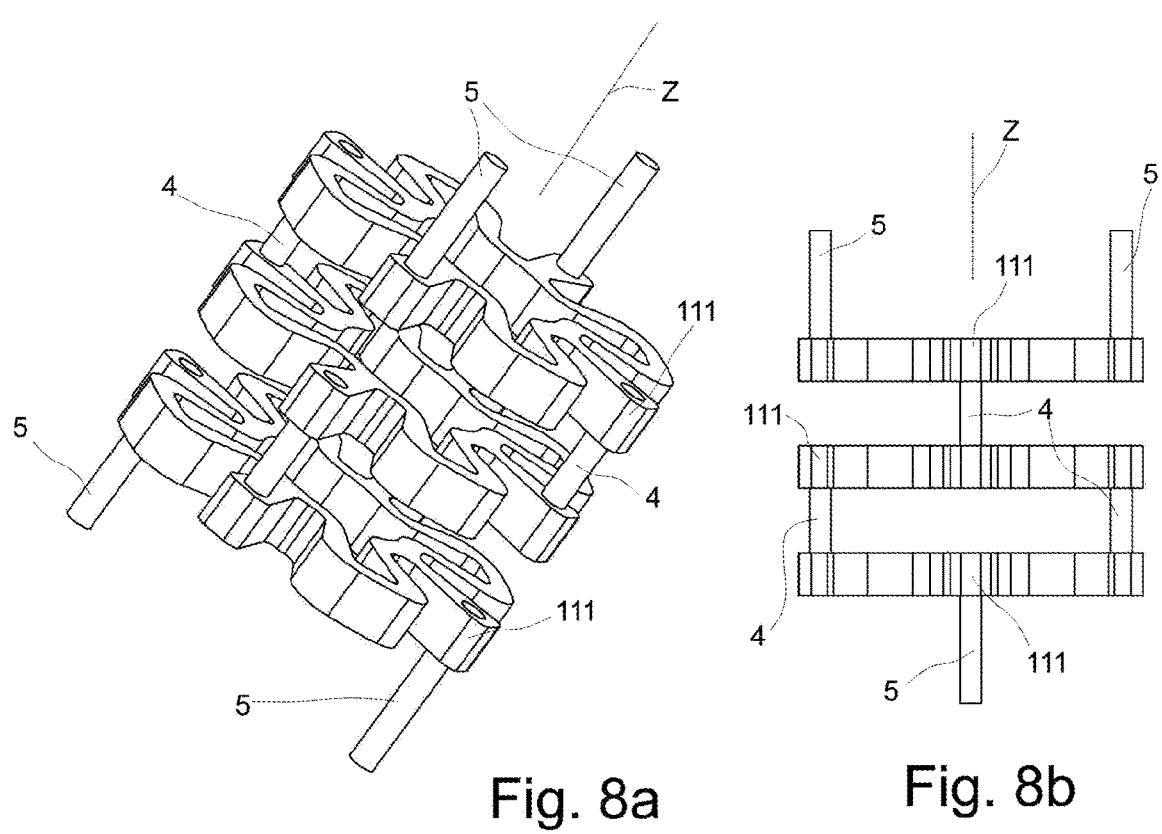

It is worth noting from the drawings how the organisation of the bridging members may be such that the springs react in parallel (FIGS. 7a, 7b) or in series (FIGS. 8a, 8b) to the torsional load. In the first case, the axially internal links 4 mutually join all the corresponding main members 111 (that is, aligned according to directrixes parallel to the transmissive axis Z), while in the second case, the internal links 4 are arranged so as to connect only one or some corresponding main radial members between a first spring and the successive (second) spring, while between the second spring and the successive (third) spring the links connect radial members on a directrix not involved by the preceding link, and so on. For reasons of symmetry and engineering efficiency, a particular advantageous solution for making the system in series provides for the internal connection links between one spring and the successive one to be gradually offset by a circumferential position as moving along the transmissive axis Z. In general, external links 5 protruding from the start/end springs of the series are designed for connecting the system with the actuating element (input) and the actuated element (output), respectively.

In principle, also an assembly of two or more springs according to the invention in a coplanar arrangement can be provided, one concentrically nested into the other(s), to create in any casa an advantageously optimizable elastic system—here again according to series or parallel schemes—based on the stress and encumbrance needs.

The advantages that can result from using the spring according to the invention are apparent from that above, and in summary comprise:

characteristic linear type load-deflection function;

dimensioning ease by means of traceability to known physical models and ease of elementary resolution (bending-loaded beam systems);

increased rigidity obtainable with reduced weights and overall dimensions;

contained production costs due to the possibility of using relatively common processing techniques (laser cutting, dual axis milling, cutting by electro-erosion, etc.);

possibility of creating units having reduced axial development due to the mainly planar path;

distribution of internal loads and deformations (deflections) that can be accurately forecasted and above all, equal for the torsion loads in clockwise direction and in anticlockwise direction due to the radially symmetrical configuration;

a particularly balanced stress field, from which better performance and longer life and reliability will ensue;

versatility and ease in the realization of packages/assemblies of springs in series and parallel.

The spring according to the invention may have applications, in particular (but not exclusively) in wearable robotics. The sizes thereof in ratio to the features of rigidity and transmittable torque and also the simplicity to make the interfaces with the other elements make it a highly effective element for making elastic actuators for wearable robots and for robots in general.

The present invention was described hereto with reference to preferred embodiments thereof. It is intended that other embodiments may exist which relate to the same inventive core, within the scope of protection of the claims here attached.

The invention claimed is:

1. A torsional spring comprising a body and connection means of said body to an actuating element and to an actuated element to elastically react to a torsional load exchanged around a transmissive axis (Z), wherein said body is a unitary body with a planar structure, that is mainly developing on plane (XY) orthogonal to said transmissive axis (Z), and substantially delimited in said plane by a circular or polygonal imaginary outline (c1) circumscribing the outer periphery of said body, centered in said transmissive axis (Z), a number of cavities being formed in said body by removal of material, defining on the same body a beam-like pattern comprising an even number n of modules, each module occupying a sector delimited by said outline (c1) and by two radiuses (r1, r2) forming a central angle of $2\cdot\pi/n$, each module comprising:

two main radial members arranged along respective radiuses (r1, r2) and shared among adjacent modules, each main radial member having a radially internal end and a radially external end and forming a single elongate shape aligned along the respective radiuses (r1, r2); and a linking portion evolving between, and only linked with, two internal or external ends of the two main radial members of the module so as to be circumferentially spaced and separate from the two main radial members, symmetrically between two adjacent modules with respect to either radius (r1, r2) that separates them, and such that in each main radial member one only and the same internal end or external end be shared between two linking portions of respective adjacent modules, wherein said connection means are provided at free ends of said main radial members opposite with respect to the ends from which the linking portions evolve, said free ends being all radially external ends or radially internal ends;

wherein said linking portions evolve in a serpentine fashion and each linking portion comprises first and second secondary radial members spaced apart by a circumferential member.

2. The spring according to claim 1, wherein said connection means at said free ends are all at a same distance from said transmissive axis (Z).

3. The spring according to claim 1, wherein said connection means at said free ends are at different distances from said transmissive axis (Z).

4. The spring according to claim 1, wherein said free ends are arranged beyond one or more branching nodes.

5. The spring according to claim 1, wherein said connection means comprise one or more holes formed at said respective free ends of said main radial members.

6. The spring according to claim 1, wherein said body is also substantially delimited by a minor circular or polygonal imaginary outline (c2) centered in said transmissive axis (Z), whereby said modules occupy respective sectors defined between said major and said minor outline.

7. The spring according to claim 1, wherein at least said main radial members radially extend for at least a half of the maximum radial distance between said major outline (c1) and said minor outline (c2).

8. The spring according to claim 7, wherein an outer edge and an inner edge of said circumferential members are defined respectively by said major outline (c1) and said minor outline (c2).

9. The spring according to claim 8, wherein said minor outline (c2) defines a central inner passage of said body.

10. The spring according to claim 1, wherein at least said radial members have a laminar structure.

11. The spring according to claim 1, wherein said even number of modules is greater than or equal to 4.

12. The spring according to claim 1, wherein the ratio between the maximum width of said major outline (c1) and the thickness of said body measured along said transmissive axis (Z) is greater than or equal to 5.

13. An elastic system comprising a plurality of springs according to claim 1, arranged side by side in a sequence along a common transmissive axis (Z), and bridging members that extend axially to mutually link the connection means of each couple of springs sequentially adjacent.

14. The system according to claim 13, wherein said bridging members are configured, between at least two consecutive springs of said plurality, such that said springs react in series to said torsional load.

15. The system according to claim 13, wherein said bridging members are configured, between at least two consecutive springs of said plurality, such that said springs react in parallel to said torsional load.

16. The spring according to claim 1, wherein the connection means forms an opening along the respective radiuses (r1, r2) of the respective main radial member.

* * * * *